United States Patent
Chung et al.

(10) Patent No.: US 6,433,864 B1
(45) Date of Patent: Aug. 13, 2002

(54) APPARATUS FOR MONITORING OPTICAL SIGNAL-TO-NOISE RATIO OF OPTICAL SIGNALS IN WDM OPTICAL TRANSMISSION SYSTEM

(75) Inventors: Yun Chur Chung; Seung Kyun Shin, both of Taejun; Keun Joo Park, Mokpo, all of (KR)

(73) Assignee: Korea Advanced Institute of Science and Technology, Taejun (KR)

( * ) Notice: Subject to any disclaimer, the term of this patent is extended or adjusted under 35 U.S.C. 154(b) by 0 days.

(21) Appl. No.: 09/626,017

(22) Filed: Jul. 26, 2000

(30) Foreign Application Priority Data

Jul. 30, 1999 (KR) .............................. 99-31403

(51) Int. Cl.⁷ .............................. G01N 21/00
(52) U.S. Cl. ..................................... 356/73.1
(58) Field of Search ................. 356/73.1; 359/110, 359/124–134, 109–195; 250/214 R, 214 C, 227.12, 227.24

(56) References Cited

U.S. PATENT DOCUMENTS 6,268,943 B1 * 7/2001 Kang ..................... 359/110

* cited by examiner

Primary Examiner—Frank G. Font
Assistant Examiner—Tu T Nguyen
(74) Attorney, Agent, or Firm—Akin, Gump, Strauss, Hauer & Feld, L.L.P.

(57) ABSTRACT

The optical signal-to-noise ratio (OSNR) of optical signals that are demultiplexed into a plurality of optical channels by a wavelength-division multiplexing (WDM) optical transmission system is monitored by an apparatus which outputs the optical signals of each optical channel on a first path and a second path, and measures the signal intensity of each of the optical signals on the first path. The apparatus selectively passes an AC component of each of the optical signals on the second path and processes the AC component by converting the AC component into a digital signal and performing a fast fourier transform on the digital signal. The apparatus measures the noise intensity of the processed AC component on the second path. The OSNR of each optical signal is calculated by comparing the measured signal intensity of each of the optical signals and the measured noise intensity of the processed AC component of each of the optical signals.

18 Claims, 8 Drawing Sheets

APPARATUS FOR MONITORING OPTICAL SIGNAL-TO-NOISE RATIO OF OPTICAL SIGNALS IN WDM OPTICAL TRANSMISSION SYSTEM

TECHNICAL FIELD

The present invention relates to an apparatus for monitoring optical signal-to-noise ratio of optical signals in wavelength-division-multiplexing (WDM) optical transmission system, and more particularly, to an apparatus for monitoring optical signal-to-noise ratio of each optical signal by measuring noise signal occurring when an optical signal is detected through de-multiplexing optical signals at each channel in wavelength-division-multiplexing (WDM) optical transmission system.

BACKGROUND OF THE INVENTION

Wavelength-division-multiplexing (WDM) optical transmission system is a system that transmits several transmission lasers with different wavelengths from each other by multiplexing them in an optical fiber.

By using the system, there is an advantage to significantly increase transmission capacities per optical fiber, even though each laser operates with relatively low transmission rate.

It is necessary to use an optical fiber amplifier for amplifying optical signals so as to increase transmission range in these systems. However, due to amplified spontaneous emission (ASE) light, occurring when the optical fiber amplifier amplifies optical signals, optical signal-to-noise ratios of the optical signals are deteriorated and therefore, that causes performance degradation of total system.

That is to say, as optical signal-to-noise ratio of an optical signal is directly related to the performance of system, the performance of wavelength-division-multiplexing (WDM) optical transmission system can be measured by monitoring optical signal-to-noise ratio. Also, more effective maintenance of a system is achieved by comprehending precise performance of the system.

Especially, in the case of all optical transmission networks, which is expanded wavelength-division-multiplexing (WDM) optical transmission system, due to different optical signal-to-noise ratio of an optical signal at each channel, the monitoring of optical signal-to-noise ratio for each optical signal is indispensable.

Conventional method for monitoring optical signal-to-noise ratio of an optical signal was using optical spectrum analyzer with rotating diffraction grating.

Even though these optical spectrum analyzers have advantages of wide measurement range and high accuracy, there is disadvantage of additional installation cost in wavelength-division-multiplexing (WDM) optical transmission system caused by high volume and high cost.

Several methods for monitoring wavelength-division-multiplexing (WDM) optical signal-to-noise ratio of an optical signal, while complementing the disadvantage, have been proposed.

First, there is one technique of "Signal Monitoring Apparatus for Wavelength-division-multiplexed Optical Communication" [U.S. Pat. No. 5,796,479], which was issued for a patent by Dennis Derickson and Roger Lee Jungerman and registered.

This method separates wavelength-division-multiplexing (WDM) optical signals, which are incident upon via an optical fiber by using diffraction grating, at each wavelength and then monitors optical signal-to-noise ratio of the optical signal by using photo diode array.

However, this method has problems of low accuracy in measurement and instability of optical spatial alignment on account of spatial distance between the optical fiber and the diffraction grating.

Next, another technique was described in a paper entitled "A High-Performance Optical Spectrum Monitor with High-Speed Measuring Time for WDM Optical Networks" written by K. Otsuka, Y. Sampei, Y. Tachikawa, N. Fukushima, and T. Chikama, in "97 European Conference on Optical Communication, pp. 147–150, 1997". As this method also used a diffraction grating and photo diode array, there were problems of instability in optical spatial alignment and low accuracy in measurement.

Next, another technique was described in a paper entitled "High Resolution Fiber Grating Optical Network Monitor" written by Chris Koeppen, Jefferson L. Wagner, Thomas A. Strasser, and John KeMarco, in "National Fiber Optic Engineers Conference '98, Sep. 14–17, 1998". This method used a blazed bragg grating and photo diode array.

However, this method had problems of not having precise measurement result of optical signal-to-noise ratio of an optical signal unless spatial alignment between the blazed bragg grating and photo diode array is stable.

Besides, there is method for monitoring optical signal-to-noise ratio of an optical signal by using Fabry-Perot Filter.

However, these methods for monitoring optical signal-to-noise ratio of an optical signal are useful only when optical signal-to-noise ratios are nearly same and the characteristic of amplified spontaneous emission (ASE) light, occurring from optical amplifier, is flat. Particularly, in the case of all optical transmission network, which is expanded wavelength-division-multiplexing (WDM) optical transmission system, as each channel is added/dropped by an optical add-drop multiplexer, transmission range at each channel is different from each other.

Therefore, the intensities of amplified spontaneous emission (ASE) lights, which are occurring from optical amplifier, are different from each other and as a result, optical signal-to-noise ratio at each channel is different.

FIG. 1 shows optical spectrums in wavelength-division-multiplexing (WDM) optical transmission network, after passing several optical add-drop multiplexers. Referring to FIG. 1, it is known that the spectrums of optical noises, occurring from optical amplifier, does not have flat characteristics by arrayed waveguide grating within optical add-drop multiplexer and optical signal-to-noise ratio at each channel is different from each other.

Moreover, as the optical signal is distorted by optical filter such as array waveguide grating, core device of optical add-drop multiplexer, these conventional methods have problem of impossibility in the measurement of optical signal-to-noise ratio.

FIG. 2A and FIG. 2B show optical spectrums measured by optical spectrum analyzer with resolution of 0.05 nm after passing an optical signal with 25 dB of optical signal-to-noise ratio through wavelength-division-multiplexing optical add-drop multiplexer.

In the FIG. 2A is capable of monitoring optical signal-to-noise ratio when passing through optical add-drop multiplexer with passband of 1.1 nm. However, FIG. 2B is difficult to monitor optical signal-to-noise ratio when passing through optical add-drop multiplexer with passband of 0.3 nm.

Due to the low resolution, the measurement of optical signal-to-noise ratio is impossible in the case of FIG. 2B, which is impossible to be measured by optical spectrum analyzer with high resolution. Therefore, new method for monitoring optical signal-to-noise ratio, which is also applicable to wavelength-division-multiplexing (WDM) optical transmission network, is indispensable.

SUMMARY OF THE INVENTION

An object of the present invention is to provide an apparatus for monitoring optical signal-to-noise ratio in wavelength-division-multiplexing optical transmission system, in which maintenance and management of system can be effectively performed by de-multiplexing the optical signal of each channel in wavelength-division-multiplexing optical transmission system, applying the signal to optical detector, and then monitoring optical signal-to-noise ratio from the quantity of noise occurring when the applied optical signals are detected by the optical detector.

To achieve the object according to the present invention, the present invention applicable to optical add-drop multiplexer, in which wavelength-division-multiplexed optical signals are split at each channel, provides an apparatus for monitoring optical signal-to-noise ratio in wavelength-division multiplexing optical transmission system, comprising: an optical splitting means for splitting optical signals applied from an external; an optical power measuring means for measuring intensities of optical signals out of a portion of said split optical signals; a noise measuring means for measuring intensities of noises occurring when detecting optical signals out of other portions of said split optical signals; and an optical signal-to-noise ratio (OSNR) calculating means for calculating optical signal-to-noise ratio from both said intensities of the optical signals and said intensities of the noises.

Preferably, said optical splitting means is either star coupler or grating device of an optical fiber for providing a portion of optical signals to both said power measuring means and said noise measuring means, after passing most of optical signals out of optical signals applied through an arbitrary optical fiber.

Preferably, said optical power measuring means is an optical power monitor for measuring intensities of optical signals out of optical signals applied through said optical splitting means.

Preferably, said optical power measuring means includes an optical signal detecting means for transforming optical signals, applied through said optical splitting means, into electric signals and an amplifier for measuring intensities of optical signals after amplifying only DC elements out of the electric signals detected from said optical signal detecting means.

Preferably, said noise measuring means includes an optical signal detecting means for transforming optical signals, applied through said optical splitting means, into electric signals, an AC amplifying means for amplifying only noise elements from said optical signal detecting means, and a noise intensity measuring means for measuring noises of the optical signal from said AC amplifying means.

More preferably, said AC amplifying means includes a capacitor cutting off low frequency for passing only AC elements and cutting off DC element of the detected optical signals from said optical signal detecting means, and an amplifier for amplifying AC elements having passed said capacitor.

Preferably, said noise intensity measuring means includes a analog-to-digital converting means for converting electric signals of the noise element being output from said AC amplifying means into digital signals, a fast fourier transforming means for performing fast fourier transformation on the converted digital signal from said analog-to-digital converting means, and a noise intensity calculating means for calculating noise intensity by using said fast fourier transformed value.

Preferably, said noise intensity measuring means includes an electric filtering means for extracting only noise elements of an optical signal detecting means after electrically filtering the electric signal of noise elements being output from said AC amplifying means and a power sensing means for detecting noises' intensities from the output of said electric filtering means.

Preferably, said optical signal-to-noise ratio (OSNR) calculating means calculates optical signal-to-noise ratio (OSNR) by applying such as intensities of optical signals ($P_{total}$) being monitored from said optical power measuring means, noises' intensities ($N_{total}$) being monitored from said noise measuring means, non-beat noise ($N_{nonbeat}$) already monitored, resolution (R), bandwidth of the optical signals ($B_o$), amplification constant (A) of optical signal detector and AC amplifying means, etc. to following Equation:

$$N_{total} = N_{beat} + N_{shot} + N_{thermal} + N_{circuit} + N_{signal} \quad \text{[Equation]}$$
$$= N_{beat} + N_{nonbeat}$$
$$P_{total} = P_{sig} + P_{ase} = P_{sig}\left(1 + \frac{1}{OSNR}\frac{B_o}{R}\right)$$
$$N_{beat} = A\left(2P_{sig}P_{ase}\frac{1}{B_o} + P_{ase}^2\frac{1}{B_o}\right)$$
$$= 2\frac{A}{R}P_{sig}^2\left(\frac{1}{OSNR} + \frac{B_o}{2R \cdot OSNR^2}\right)$$

Where, A is constant, and $P_{sig}$, $P_{ase}$, and $B_o$ are intensity of signal, intensity of amplified spontaneous emission (ASE) light, and bandwidth of optical signal respectively, and OSNR is optical signal-to-noise ratio being monitored with resolution of R.

Preferably, said optical signal-to-noise ratio (OSNR) calculating means calculates optical signal-to-noise ratio (OSNR) by applying such as noise intensities of noises ($N_{total}$) being monitored from said noise measuring means, non-beat noise ($N^{nonbeat}$) already monitored, resolution (R), bandwidth of the optical signals ($B_o$), amplification constants (C and D) of optical signal detector and AC amplifying means, etc. to following Equation:

$$N_{total} = N_{beat} + N_{shot} + N_{thermal} + N_{circuit} + N_{signal} \quad \text{[Equation]}$$
$$= N_{beat} + N_{nonbeat}$$
$$P_{total} = P_{sig} + P_{ase} = P_{sig}\left(1 + \frac{1}{OSNR}\frac{B_o}{R}\right)$$
$$N_{beat} \text{ [dB]} = 10\log\left(\frac{2A}{R}\right) + 2P_{sig} \text{ [dB]} - C \cdot OSNR \text{ [dB]}$$
$$= D + 2P_{sig} \text{ [dB]} - C \cdot OSNR \text{ [dB]}$$

Where, C and D are constants, and $P_{sig}$, $P_{ase}$, and $B_o$ are intensity of signal, intensity of amplified spontaneous emission (ASE) light, and bandwidth of optical signals respectively, and OSNR is optical signal-to-noise ratio being monitored with resolution of R.

BRIEF DESCRIPTION OF THE DRAWINGS

The embodiments of the present invention will be explained with reference to the accompanying drawings, in which.

DETAILED DESCRIPTION OF THE INVENTION

Referring accompanied drawings, an apparatus for monitoring optical signal-to-noise ratio of wavelength-division-multiplexing (WDM) signals in optical transmission system according to the preferred embodiments of the present invention is described in detail.

Figure 1:
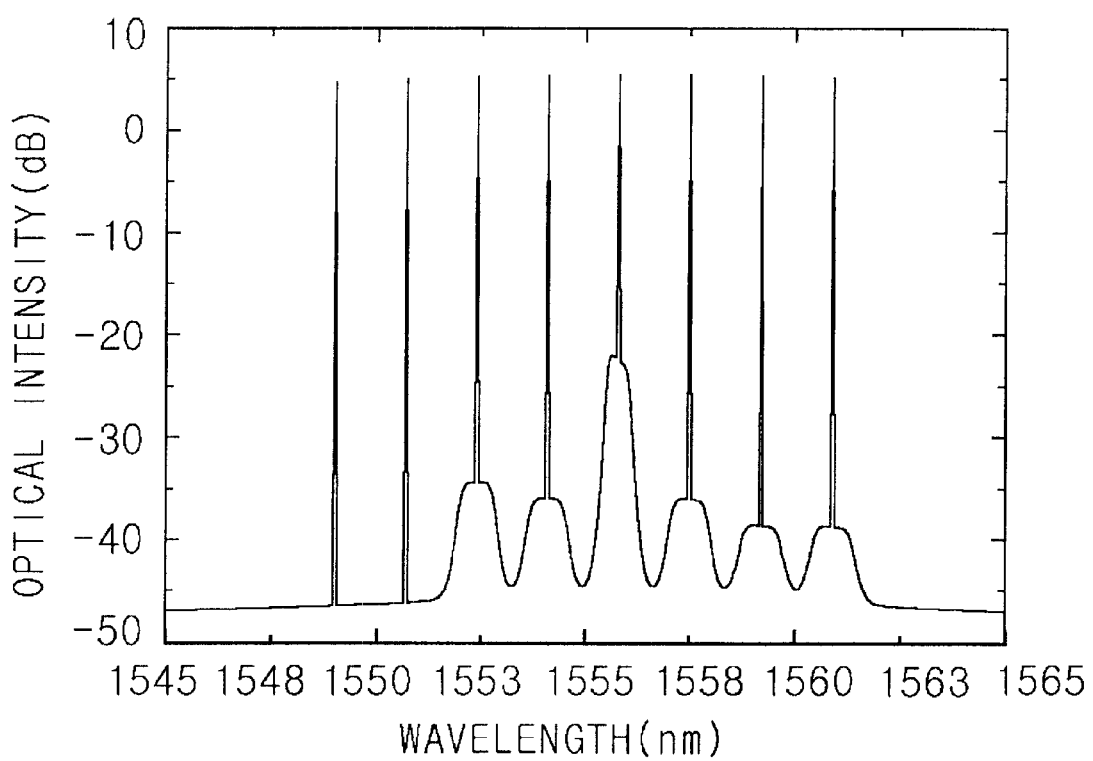
FIG. 1 shows optical spectrums in wavelength-division-multiplexing (WDM) optical transmission network, after passing several optical add-drop multiplexer.
Figure 2A:
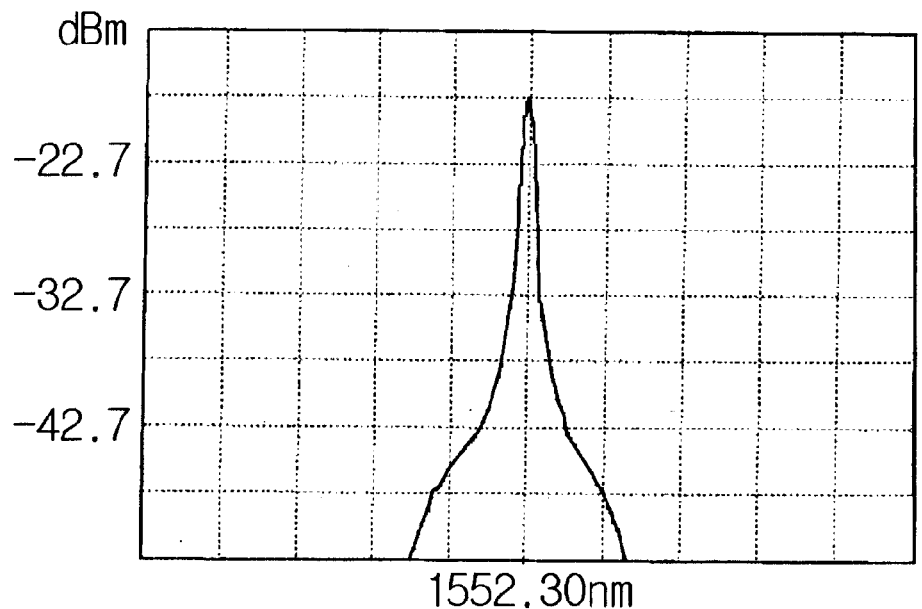
FIG. 2A and FIG. 2B show optical spectrum measured by optical spectrum analyzer with resolution of 1.1 nm and 0.05 nm after passing an optical signal with 25 dB of optical signal-to-noise ratio through wavelength-division-multiplexing optical add-drop multiplexer.
Figure 2B:
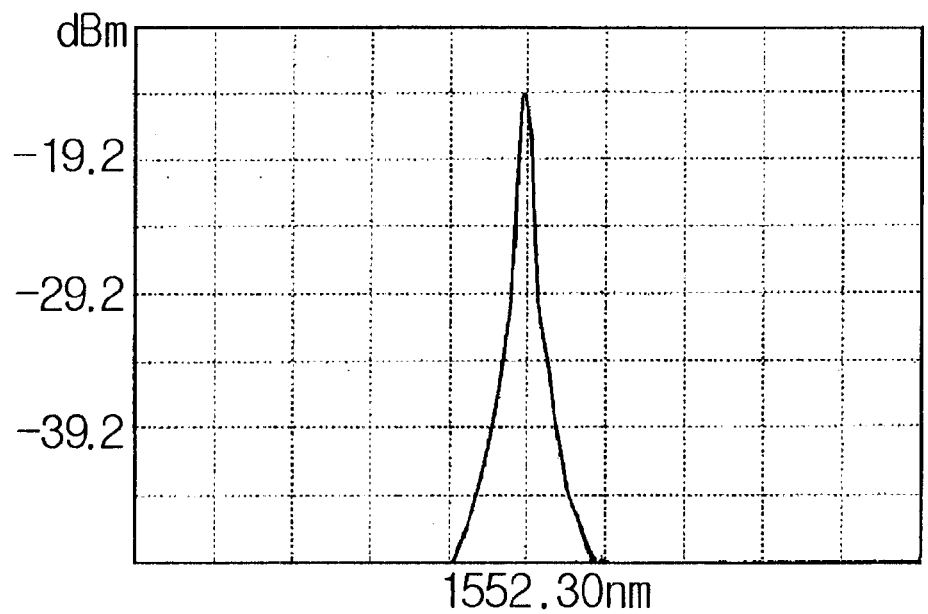
Figure 3:
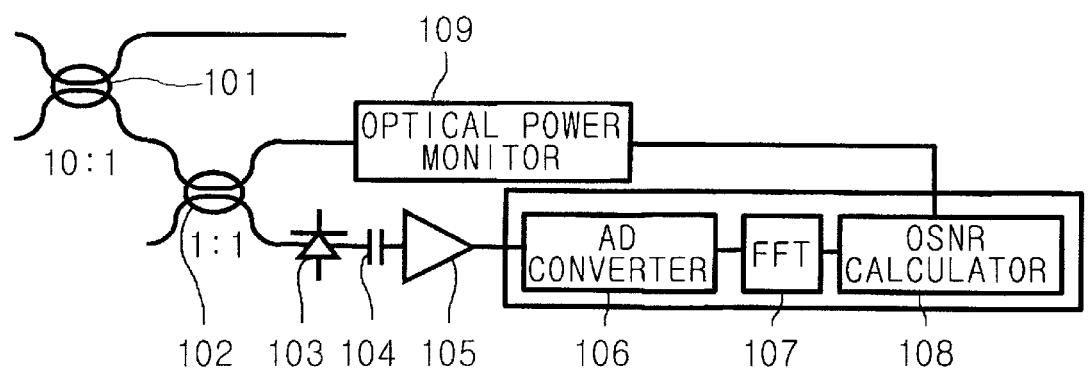
FIG. 3 is a drawing illustrating an apparatus for monitoring optical signal-to-noise ratio according to a preferred embodiment of the present invention.

FIG. 3 is a drawing illustrating an apparatus for monitoring optical signal-to-noise ratio according to a first preferred embodiment of the present invention.

As shown in FIG. 3, an apparatus for monitoring optical signal-to-noise ratio according to the first embodiment of the present invention is constructed by a first star coupler 101, a second star coupler 102, an optical detector 103, a capacitor 104, an amplifier 105, an analog-to-digital (AD) converter 106, a fast fourier transformer (FFT) 107, an OSNR calculator 108, and an optical power monitor 109.

The first star coupler 101 passes most of wavelength-division-multiplexing optical signals applied through an arbitrary optical fiber and extracts a portion of optical signals and then provides them to the second star coupler 102.

The second star coupler 102 provides optical signals, applied through the first star coupler 101, to both the optical power monitor 109 and the optical detector 103 by dividing the optical signals at same magnitude.

The optical power monitor 109 monitors signal power of the optical signals and then provides them to the OSNR calculator 108.

The optical detector 103 converts the applied optical signal into the electric signal. The DC components of the electric signal are cut off by the capacitor 104 and only AC components are provided to the amplifier 105.

The amplifier 105 amplifies only the AC component and the analog-to-digital converter 106 converts the amplified AC component into the digital signal.

The digital signal is transformed into frequency region by the fast fourier transformer 107 and then is applied to the OSNR calculator 108.

The OSNR calculator 108 calculates optical signal-to-noise ratio by using signal power of the optical signal, which is provided from the optical power monitor 109, and noise power of the optical signal, which is provided from the fast fourier transformer 107.

Figure 4:
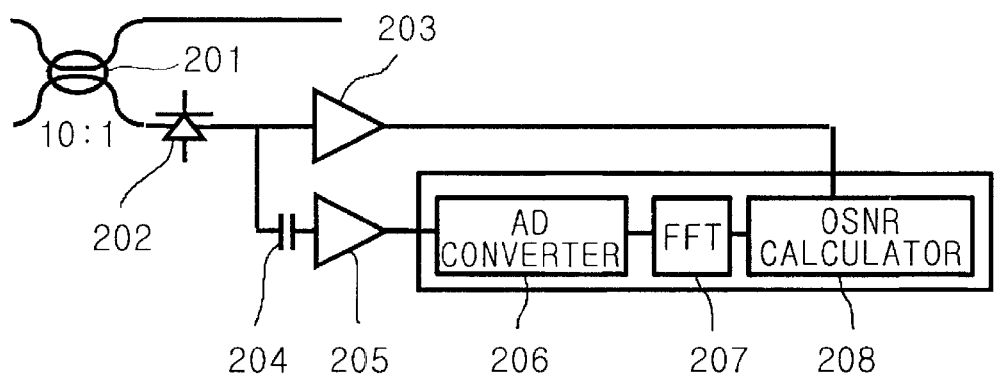
FIG. 4 through FIG. 6 are drawings illustrating apparatuses for monitoring optical signal-to-noise ratio in wavelength-division multiplexing optical transmission system according to other preferred embodiments of the present invention.
Figure 5:
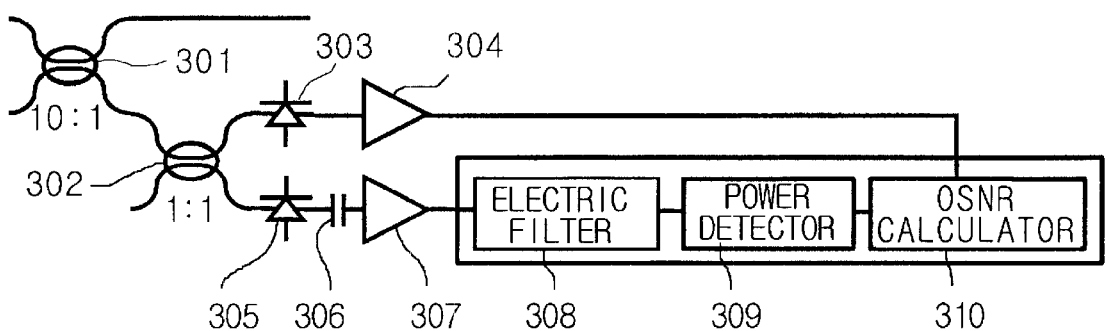
Figure 6:
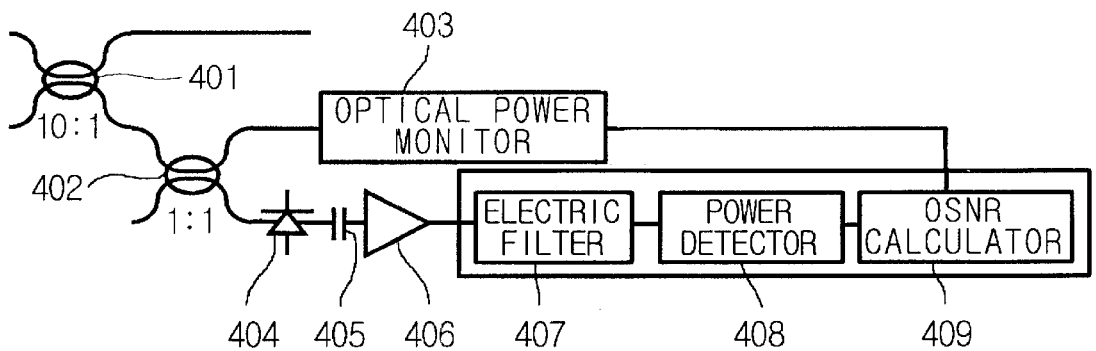

FIG. 4 through FIG. 6 are drawings illustrating apparatuses for monitoring optical signal-to-noise ratio in wavelength-division-multiplexing optical transmission system according to other preferred embodiments of the present invention.

Referring FIG. 4, an apparatus for monitoring optical signal-to-noise ratio according to a second preferred embodiment of the present invention is constructed by a star coupler 201, an optical detector 202, a DC amplifier 203, a capacitor 204, an AC amplifier 205, an analog-to-digital (AD) converter 206, a fast fourier transformer (FFT) 207, and an OSNR calculator 208.

The star coupler 201 passes most of wavelength-division-multiplexing optical signals applied through an arbitrary optical fiber and extracts a portion of the optical signals and then provides them to the optical detector 202.

The optical detector 202 converts an optical signal into an electric signal and output it. As the DC component of the electric signal is cut off by the capacitor 204, it is transferred to the DC amplifier 203. And AC component is passed through the capacitor 204 and is provided to the AC amplifier 205.

As the DC amplifier 203 amplifies DC component of the electric signal, it provides intensity of optical signal to the OSNR calculator 208. And as the AC amplifier 205 amplifies AC component of the electric signal, it provides noise component of the optical signal to the analog-to-digital converter 206.

The noise component of the optical signal is converted into the digital signal and transformed into frequency region by the fast fourier transformer 207 and noise intensity of the optical signal, which is calculated from the resultant value of the fast fourier transformer 207, is applied to the OSNR calculator 208.

The OSNR calculator 208 calculates optical signal-to-noise ratio by using signal power of the optical signal, which is provided from the DC amplifier 203, and noise power of the optical signal, which is provided from the fast fourier transformer 207.

Referring FIG. 5, an apparatus for monitoring optical signal-to-noise ratio according to a third preferred embodiment of the present invention is constructed by a first star coupler 301, a second star coupler 302, a first optical detector 303, a first amplifier 304, a second optical detector 305, a capacitor 306, a second amplifier 307, an analog-todigital (AD) converter 308, a fast fourier transformer (FFT) 309, and an OSNR calculator 310.

The first star coupler 301 passes most of wavelength-division-multiplexing optical signals applied through an arbitrary optical fiber and extracts a portion of the optical signals and then provides them to the second star coupler 302.

The second star coupler 302 provides the optical signals, applied through the first star coupler 301, to both the first optical detector 303 and the second optical detector 305 by dividing the optical signals at same magnitude.

The first optical detector 303 converts the first optical signal, applied through the second star coupler 302, into the first electric signal and the first amplifier 304 amplifies the first electric signal and then provides it to the OSNR calculator 310. That is, the intensity of the optical signal, which was detected by the first optical signal, is provided to the OSNR calculator 310.

The second optical detector 305 converts the second optical signal, applied through the second star coupler 302, into the second electric signal and the capacitor 306 cuts off the DC component of the second electric signal and passes only the AC component of the second electric signal. The second amplifier 307 amplifies the AC component of the second electric signal and this is converted into the digital signal by the analog-to-digital converter 308. The digital signal is transformed into frequency region by the fast fourier transformer 309, and then noise intensity of the optical signal, which is extracted from the resultant value of the fast fourier transformer 309, is provided to the OSNR calculator 310.

The OSNR calculator 310 calculates optical signal-to-noise ratio by using signal intensity of the optical signal, which is provided from the first amplifier 304, and noise intensity of the optical signal, which is provided from the fast fourier transformer 309.

Referring FIG. 6, an apparatus for monitoring optical signal-to-noise ratio according to a fourth preferred embodiment of the present invention is constructed by a first star coupler 401, a second star coupler 402, an optical power monitor 403, an optical detector 404, a capacitor 405, an amplifier 406, an electric filter 407, a power detector 408 and an OSNR calculator 409

As the first star coupler 401, the second star coupler 402, the optical power monitor 403, the optical detector 404, the capacitor 405 and the amplifier 406 are equal to those of the above-mentioned first embodiment in the composition and effect, detailed descriptions are omitted.

In the fourth embodiment, the noise measuring means, which is composed of the electric filter 407 and the power detector 408, is different from that of the first embodiment, and detailed descriptions are as follows.

The electric filter 407 outputs only noise component of the optical detector 404 by electrically filtering the noise component of the optical signal, which is provided from the amplifier 406.

The OSNR calculator 409 calculates optical signal-to-noise ratio by using signal intensity of the optical signal, which is provided from the amplifier 406, and noise intensity, which is provided from the fast fourier transformer 408.

Figure 7:
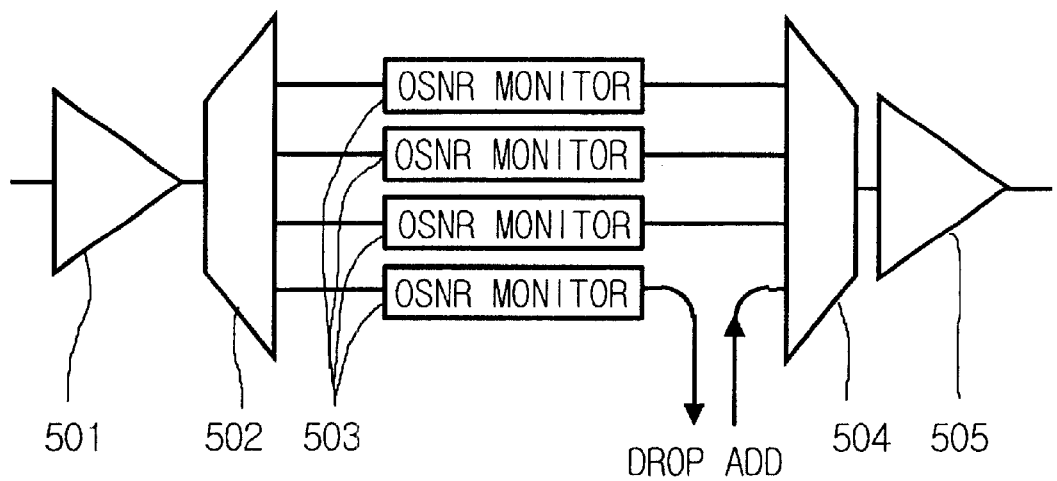
FIG. 7 shows an example applying an apparatus for monitoring optical signal-to-noise ratio according to the present invention to optical add-drop multiplexer of wavelength-division-multiplexing optical transmission system.

FIG. 7 shows an example applying an apparatus for monitoring optical signal-to-noise ratio according to the present invention to an optical add-drop multiplexer of wavelength-division-multiplexing optical transmission system.

In FIG. 7, an optical signal, applied into the optical add-drop multiplexer, is amplified by an optical amplifier 501 and then dropped at each channel by a channel splitter 502.

A measuring device 503 for measuring optical signal-to-noise ratio is connected to each port of the channel splitter 502 and then monitors optical signal-to-noise ratio of the optical signal at each channel.

An optical signal at each channel can be composed so as to be dropped, added, or passed and is transmitted through a channel coupler 504 and an optical amplifier 505.

Figure 8:
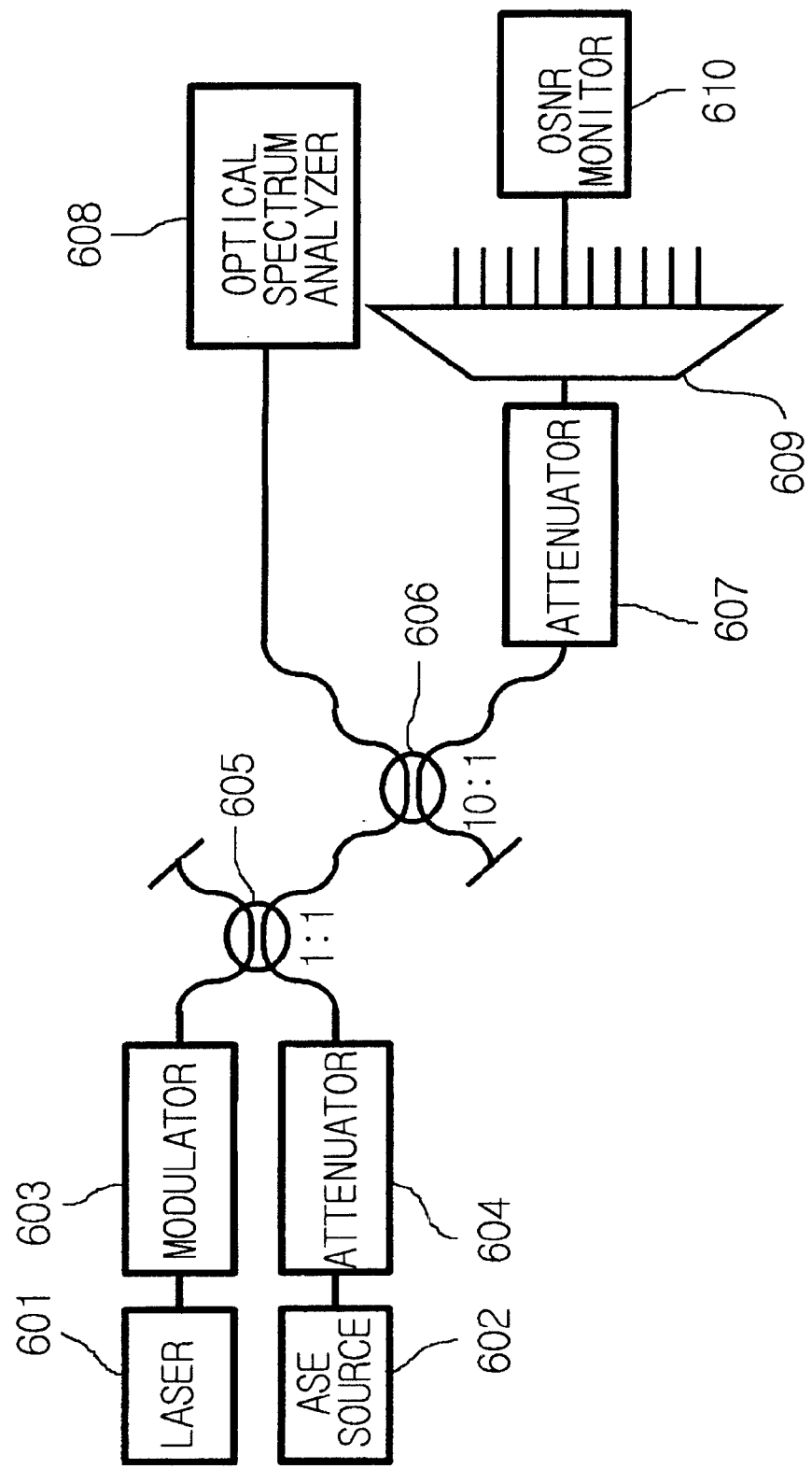
FIG. 8 shows a drawing illustrating an experimental device for monitoring optical signal-to-noise ratio of the optical signal by using optical signal-to-noise ratio according to the present invention.

FIG. 8 shows a drawing illustrating an experimental device for monitoring optical signal-to-noise ratio of the optical signal by using optical signal-to-noise ratio according to the present invention.

First, an optical signal from a laser 601 is modulated by a modulator 603, and added to the signal, which passed an amplified spontaneous emission (ASE) source and an optical attenuator 604, in the first star coupler 605.

As the added signal in the first star coupler 605 is divided by the second star coupler 606, some portions of the optical signal is applied into an optical spectrum analyzer 608 and the rest of the optical signal is applied into a channel splitter 609 through an optical attenuator 607. The optical signal, which is passed through a channel splitter 609, is applied to an apparatus for monitoring optical signal-to-noise ratio (OSNR monitoring apparatus) 610 and the optical signal-to-noise ratio is monitored.

And, by comparing the optical signal-to-noise ratio analyzed by the optical spectrum analyzer 608 with the optical signal-to-noise ratio calculated by the OSNR monitoring apparatus 610, optical signal-to-noise ratio error can be solved using the apparatus monitoring optical signal-to-noise ratio according to the present invention.

Figure 9:
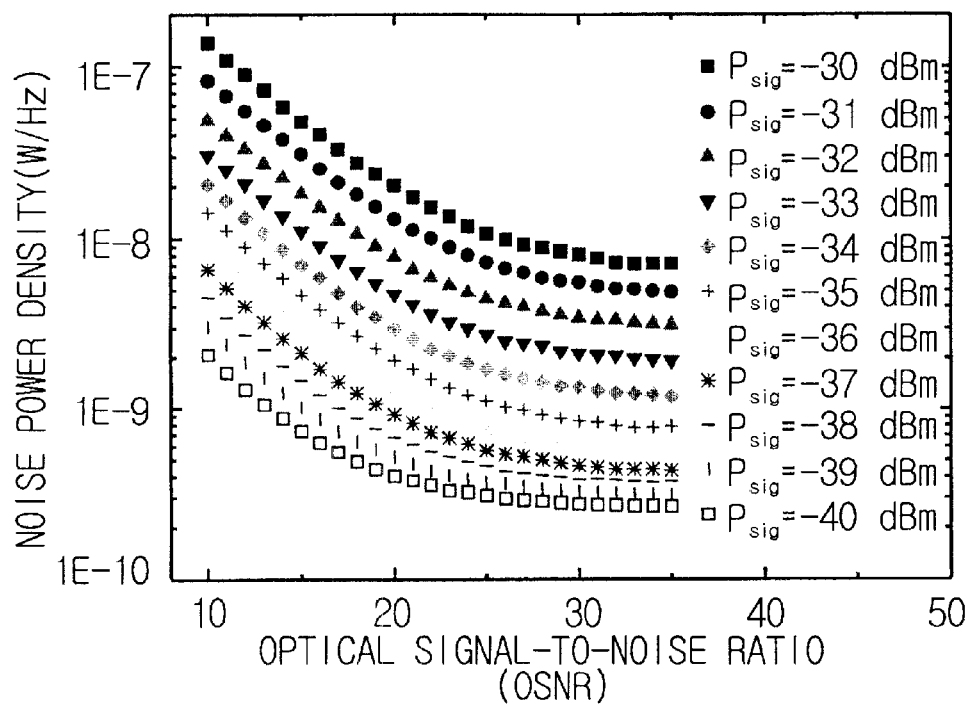
FIG. 9 is a plot illustrating noise power density of an optical signal occurring in an optical detector, while varying optical signal-to-noise ratio from 10 dB to 35 dB.

FIG. 9 is a plot illustrating noise power density of an optical signal produced in an optical detector, while varying optical signal-to-noise ratio from 10 dB to 35 dB. At this time, the intensity of the optical signal is varied from −40 dBm to −30 dBm. Also, noise power density was measured by averaging noise intensity obtained by doing fast fourier transformation on the noise component of the optical signal.

The noises in the optical detector can be divided into beat noise ($N_{beat}$), shot noise ($N_{shot}$), thermal noise ($N_{thermal}$), circuit noise ($N_{circuit}$), etc. Here, though the beat noise is noise component varying according to optical signal-to-noise ratio, shot noise, thermal noise, and circuit noise are irrelevant to the optical signal-to-noise ratio.

Also, when measuring noise in the optical detector, not only these noises but also frequency component of the optical signal itself is considered as noise ($N_{signal}$). However, this frequency component of the optical signal itself is irrelevant to optical signal-to-noise ratio.

By defining these noises, irrelevant to the optical signal-to-noise ratio, as non-beat noises ($N_{nonbeat}$), total noise power density ($N_{total}$), measured in the optical detector, is expressed as following Equation 1.

$$N_{total} = N_{beat} + N_{shot} + N_{thermal} + N_{circuit} + N_{signal} = N_{beat} + N_{nonbeat} \qquad \text{[Equation 1]}$$

Referring FIG. 9, noise power density increases as the optical signal-to-noise ratio decreases and maintains nearly constant value if the optical signal-to-noise ratio is larger than 30 dB. The reason is that non-beat noise is dominant noise source in the region of above 30 dB.

Hence, the non-beat is measured by varying the intensity of the optical signal, while fixing optical signal-to-noise ratio at 35 dB.

Figure 11:
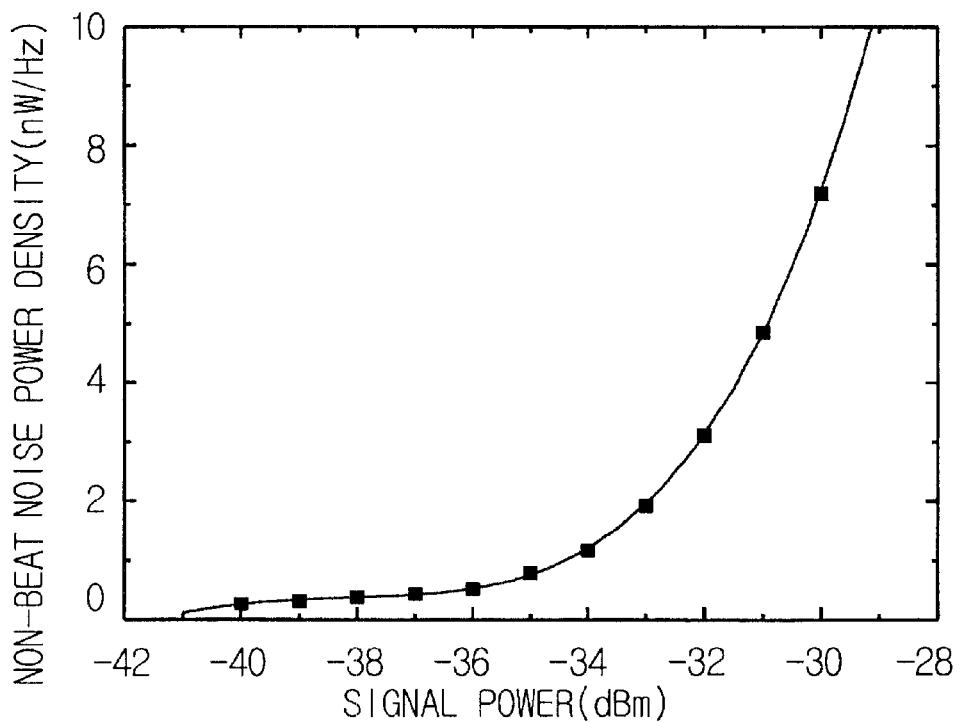
FIG. 11 is a plot illustrating non-beat noise power density of optical power detector according to optical signal-to-noise ratio.

FIG. 11 is a plot illustrating non-beat noise power density measured by doing this. The non-beat noise data of FIG. 11 can be easily expressed as an equation by polynomial approximation.

Figure 10:
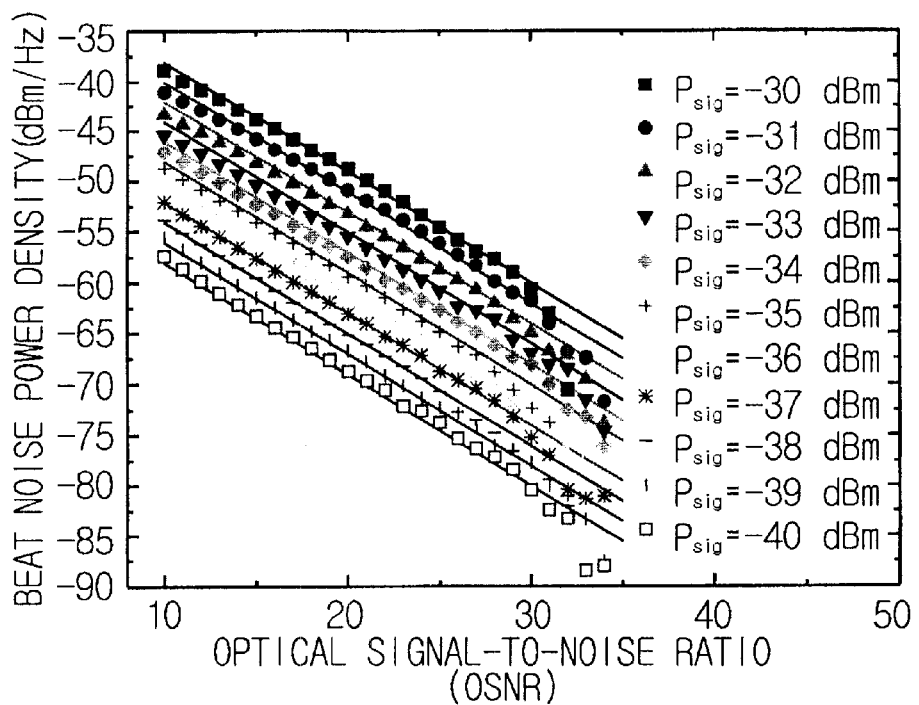
FIG. 10 is a plot illustrating power density of beat noise according to optical signal-to-noise ratio.

FIG. 10 is a plot illustrating power density of beat noise by subtracting the non-beat noise of FIG. 11 from the noise power density of FIG. 9. The power density of beat noise increases as the intensity of the optical signal increases or optical signal-to-noise ratio increases. And the power density of beat noise can be expressed as Equation 2.

$$N_{beat} = A\left(2P_{sig}P_{ase}\frac{1}{B_o} + P_{ase}^2 \frac{1}{B_o}\right)$$

$$= 2\frac{A}{R}P_{sig}^2\left(\frac{1}{OSNR} + \frac{B_o}{2R \cdot OSNR^2}\right)$$

[Equation 2]

Where, A is constant, and $P_{sig}$, $P_{ase}$, and $B_o$ are intensity of signal, intensity of ASE light and a bandwidth of optical signal respectively, and OSNR is optical signal-to-noise ratio being monitored with resolution of R.

Although optical signal-to-noise ratio can be monitored more precisely by using Equation 2, the present invention calculates optical signal-to-noise ratio by approximating Equation 2 to Equation 3 so as to monitor optical signal-to-noise ratio more simply.

$$N_{beat} [dB] = 10\log\left(\frac{2A}{R}\right) + 2P_{sig} [dB] -$$

$$C \cdot OSNR [dB]$$

$$= D + 2P_{sig} [dB] - C \cdot OSNR [dB]$$

[Equation 3]

Herein, C and D are varied according as the construction of optical detector, however C and D was calculated as 1.097 and 32.84 respectively in the present experiment.

The intensity of the optical signal, which is received in the optical detector, is sum of the intensity of the optical signal and the intensity of the ASE light. Therefore, the intensity of the optical signal, which is received in the optical detector, is expressed as Equation 4.

$$P_{total} = P_{sig} + P_{ase} = P_{sig}\left(1 + \frac{1}{OSNR}\frac{B_o}{R}\right)$$

[Equation 4]

An optical signal-to-noise ratio can be calculated by using the intensity of the optical signal ($P_{total}$) and the noise power density ($N_{total}$) through above described Equations 1, 2, 4, and two constants such as $B_o$ and R.

The apparatus for monitoring optical signal-to-noise ratio (OSNR monitoring apparatus), constructed according to the present invention, was applied to four lasers, different from each other, and optical signal-to-noise ratio was monitored, and the monitored value was compared with the value monitored by optical spectrum analyzer.

Figure 12:
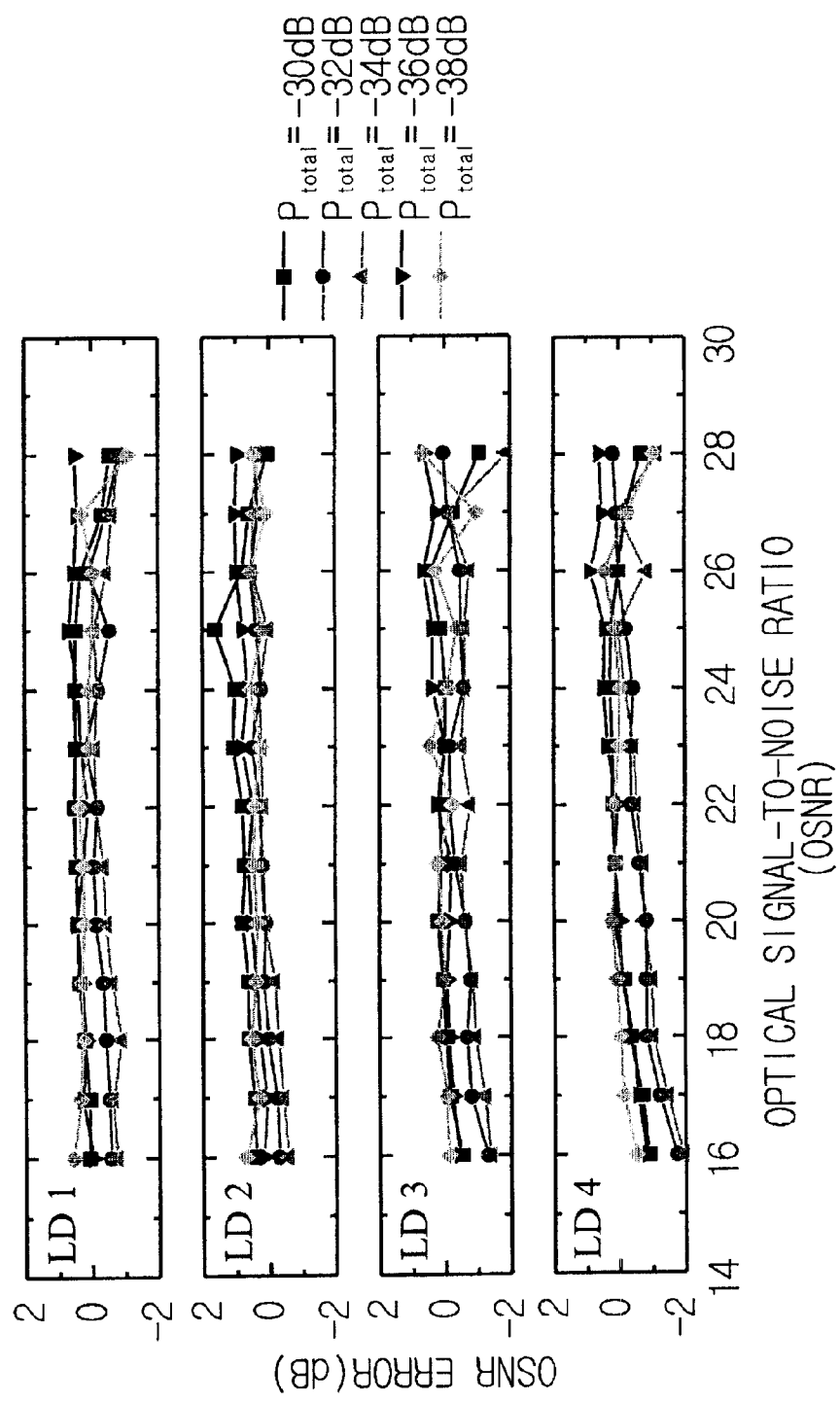
FIG. 12 is a plot illustrating errors between optical signal-to-noise ratio of the optical signal monitored by the apparatus for monitoring optical signal-to-noise ratio according to the present invention and optical signal-to-noise ratio of the optical signal monitored by the optical spectrum analyzer.

FIG. 12 is a plot illustrating errors between optical signal-to-noise ratio of the optical signal monitored by the apparatus for monitoring optical signal-to-noise ratio according to the present invention and optical signal-to-noise ratio of the optical signal monitored by the optical spectrum analyzer.

Referring to FIG. 12, though the intensity of the optical signal is varied from −30 dBm to −38 dBm and the optical signal-to-noise ratio is varied from 16 dB to 28 dB, it is known that the maximum error is within 2 dB.

Although, the present invention was described on the basis of preferably desirable examples, these desirable examples do not limit the present invention but exemplify. Also, it will be appreciated by those skilled in the art that changes and variations in the embodiments herein can be made without departing from the spirit and scope of the present invention as defined by the following claims.

What we claim:

1. An apparatus for monitoring optical signal-to-noise ratio in a wavelength-division-multiplexing (WDM) optical transmission system that demultiplexes WDM optical signals into a plurality of optical channels, the apparatus comprising:
   an optical splitting means for outputting the WDM optical signals of each optical channel on a first path and a second path;
   an optical power measuring means in the first path for measuring the signal intensity of each of the WDM optical signals on the first path;
   a noise measuring means in the second path for processing a selectively passed AC component of each of the WDM optical signals on the second path and measuring the noise intensity of the processed AC component; and
   an optical signal-to-noise ratio (OSNR) calculating means in communication with the first path and the second path for calculating an optical signal-to-noise ratio of each of the WDM optical signals by comparing the measured signal intensity of each of the WDM optical signals and the measured noise intensity of the processed AC component of each of the WDM optical signals.

2. The apparatus for monitoring optical signal-to-noise ratio in wavelength-division-multiplexing optical transmission system according to claim 1, wherein said optical splitting means is a star coupler for providing a portion of optical signals to both said power measuring means and said noise measuring means, after passing most of optical signals out of optical signals applied through an arbitrary optical fiber.

3. The apparatus for monitoring optical signal-to-noise ratio in wavelength-division-multiplexing optical transmission system according to claim 1, wherein said optical splitting means is a grating device of an optical fiber for providing a portion of optical signals to both said power measuring means and said noise measuring means, after passing most of optical signals out of optical signals applied through an arbitrary optical fiber.

4. The apparatus for monitoring optical signal-to-noise ratio in wavelength-division-multiplexing optical transmission system according to claim 1, wherein said optical power measuring means is an optical power monitor for measuring intensities of optical signals out of optical signals applied through said optical splitting means.

5. The apparatus for monitoring optical signal-to-noise ratio in wavelength-division-multiplexing optical transmission system according to claim 1, wherein said optical power measuring means includes an optical signal detecting means for transforming optical signals, applied through said optical splitting means, into electric signals and an amplifier for measuring intensities of optical signals after amplifying only DC element out of the electric signals detected from said optical signal detecting means.

6. The apparatus for monitoring optical signal-to-noise ratio in wavelength-division-multiplexing optical transmission system according to claim 1, wherein said noise measuring means includes an optical signal detecting means for transforming optical signals, applied through said optical splitting means, into electric signals, an AC amplifying means for amplifying only noise elements from said optical signal detecting means, and a noise intensity measuring means for measuring noises of the optical signals from said AC amplifying means.

7. The apparatus for monitoring optical signal-to-noise ratio in wavelength-division-multiplexing optical transmission system according to claim 6, wherein said AC amplifying means includes a capacitor for cutting off low frequency so as to pass only AC elements and cut off DC elements of the detected optical signals from said optical signal detecting means, and an amplifier for amplifying AC elements having passed said capacitor.

8. The apparatus for monitoring optical signal-to-noise ratio in wavelength-division-multiplexing optical transmission system according to claim 6, wherein said noise intensity measuring means includes an analog-to-digital converting means for converting electric signals of the noise elements being output from said AC amplifying means into digital signals, a fast fourier transforming means for performing fast fourier transformation on the converted digital signals from said analog-to-digital converting means, and a noise intensity calculating means for calculating intensities of noises by using said fast fourier transformed values.

9. The apparatus for monitoring optical signal-to-noise ratio in wavelength-division-multiplexing optical transmission system according to claim 6, wherein said noise intensity measuring means includes an electric filtering means for extracting only noise elements of an optical signal detecting means after electrically filtering the electric signals of noise elements being output from said AC amplifying means and a power sensing means for detecting intensities of noises from the output of said electric filtering means.

10. The apparatus for monitoring optical signal-to-noise ratio in wavelength-division-multiplexing optical transmission system according to claim 1, wherein said optical signal-to-noise ratio (OSNR) calculating means calculates optical signal-to-noise ratio (OSNR) by applying such as intensities of optical signals ($P_{total}$) being monitored from said optical power measuring means, intensities of noises ($N_{total}$) being monitored from said noise measuring means, non-beat noises ($N_{nonbeat}$) already monitored, resolution (R), bandwidth of the optical signals ($B_o$), amplification constant (A) of the optical signal detector and the AC amplifying means to following Equation:

$$N_{total} = N_{beat} + N_{shot} + N_{thermal} + N_{circuit} + N_{signal} \quad \text{[Equation]}$$
$$= N_{beat} + N_{nonbeat}$$
$$P_{total} = P_{sig} + P_{ase} = P_{sig}\left(1 + \frac{1}{OSNR}\frac{B_o}{R}\right)$$
$$N_{beat} = A\left(2P_{sig}P_{ase}\frac{1}{B_o} + P_{ase}^2\frac{1}{B_o}\right)$$
$$= 2\frac{A}{R}P_{sig}^2\left(\frac{1}{OSNR} + \frac{B_o}{2R \cdot OSNR^2}\right)$$

Where, A is constant, and $P_{sig}$, $P_{ase}$, and $B_o$ are intensity of signal, intensity of amplified spontaneous emission (ASE) light, and bandwidth of optical signals respectively, and OSNR is optical signal-to-noise ratio being monitored with resolution of R.

11. The apparatus for monitoring optical signal-to-noise ratio in wavelength-division-multiplexing optical transmission system according to claim 1, wherein said optical signal-to-noise ratio (OSNR) calculating means calculates optical signal-to-noise ratio (OSNR) by applying such as intensities of noises ($N_{total}$) being monitored from said noise measuring means, non-beat noise ($N_{nonbeat}$) already monitored, resolution (R), bandwidth of the optical signals ($B_o$), amplification constants (C and D) of the optical signal detector and AC amplifying means to following equation:

$$N_{total} = N_{beat} + N_{shot} + N_{thermal} + N_{circuit} + N_{signal} \quad \text{[Equation]}$$
$$= N_{beat} + N_{nonbeat}$$
$$P_{total} = P_{sig} + P_{ase} = P_{sig}\left(1 + \frac{1}{OSNR}\frac{B_o}{R}\right)$$

-continued
$$N_{beat} \text{ [dB]} = 10\log\left(\frac{2A}{R}\right) + 2P_{sig} \text{ [dB]} - C \cdot OSNR \text{ [dB]}$$
$$= D + 2P_{sig} \text{ [dB]} - C \cdot OSNR \text{ [dB]}$$

Where, C and D are constants, and $P_{sig}$, $P_{ase}$, and $B_o$ are intensity of signal, intensity of amplified spontaneous emission (ASE) light, and bandwidth of optical signals respectively, and OSNR is optical signal-to-noise ratio being monitored with resolution of R.

12. The apparatus according to claim 1, wherein the noise measuring means includes an electrical spectrum analyzer.

13. The apparatus according to claim 12, wherein the electrical spectrum analyzer includes a fast fourier transform means.

14. The apparatus according to claim 1, wherein the noise measuring means includes an analog-to-digital converter which converts the AC component into a digital signal and a fast fourier transformer for performing fast fourier transformation on the digital signal.

15. An apparatus for monitoring optical signal-to-noise ratio in a wavelength-division-multiplexing (WDM) optical transmission system that demultiplexes WDM optical signals into a plurality of optical channels, the apparatus comprising:
an optical splitting means for outputting the WDM optical signals of each optical channel on a first path and a second path;
an optical power measuring means in the first path;
a noise measuring means in the second path;
means for selectively passing an AC component of each of the WDM optical signals on the second path; and
an optical signal-to-noise ratio (OSNR) calculating means in communication with the first path and the second path.

16. The apparatus according to claim 15, wherein the means for selectively passing an AC component comprises a capacitor.

17. The apparatus according to claim 15, further comprising:
an amplifier in communication with the means for selectively passing an AC component;
an analog-to-digital converter in communication with the amplifier; and
a fast fourier transformer in communication with the analog-to-digital converter and the OSNR calculating means.

18. A method of monitoring optical signal-to-noise ratio in a wavelength-division-multiplexing (WDM) optical transmission system that demultiplexes WDM optical signals into a plurality of optical channels, the method comprising:
outputting the WDM optical signals of each optical channel on a first path and a second path;
measuring the signal intensity of each of the WDM optical signals on the first path;
selectively passing and processing an AC component of each of the WDM optical signals on the second path;
measuring the noise intensity of the processed AC component; and
calculating an optical signal-to-noise ratio (OSNR) of each of the WDM optical signals by comparing the measured signal intensity of each of the WDM optical signals and the measured noise intensity of each of the WDM optical signals.

* * * * *